United States Patent
Gibson

[15] 3,667,198
[45] June 6, 1972

[54] MOUNTING ADAPTOR FOR A REEL STRUCTURE

[72] Inventor: Charles M. Gibson, Stockton, Calif.
[73] Assignee: Universal Harvester Co., Inc., Stockton, Calif.
[22] Filed: Sept. 25, 1970
[21] Appl. No.: 75,533

[52] U.S. Cl. .................................................56/227
[51] Int. Cl. .............................................A01d 57/02
[58] Field of Search .............................56/220–227

[56] References Cited

UNITED STATES PATENTS 3,546,863   12/1970   Connolly .................................56/226

Primary Examiner—Antonio F. Guida
Attorney—Joseph B. Gardner

[57] ABSTRACT

A mounting adaptor for attaching a harvesting reel to a swather, combine, or like harvesting machine. A typifying harvesting reel is a pick-up reel having a plurality of axially extending angularly spaced bats or members each equipped with a group of pick-up fingers maintained in a predetermined orientation as the reel structure is rotated so as to enter and engage a crop being harvested at a particular disposition with respect thereto. The pick-up reel includes a control hub rotatable with the reel about an axis offset from the axis of rotation thereof and connected with the bats and groups of fingers carried thereby to enforce the desired orientation thereon. The control hub is supported for rotation by a control plate assembly having bearing structure rotatably supporting the axle of the reel structure and in turn being supported in the clamp collar of a mounting adaptor releasably and adjustably secured to the harvesting machine. The mounting adaptor accommodates dimensional differences in the reel support provided by any particular harvesting machine, and it enables the control plate assembly to be adjusted with facility to vary the disposition of the bats and pick-up fingers and thereby effect the most efficient coaction thereof with a crop to be harvested.

10 Claims, 6 Drawing Figures

INVENTOR:
CHARLES M. GIBSON
BY: Joseph B. Gardner
ATTORNEY

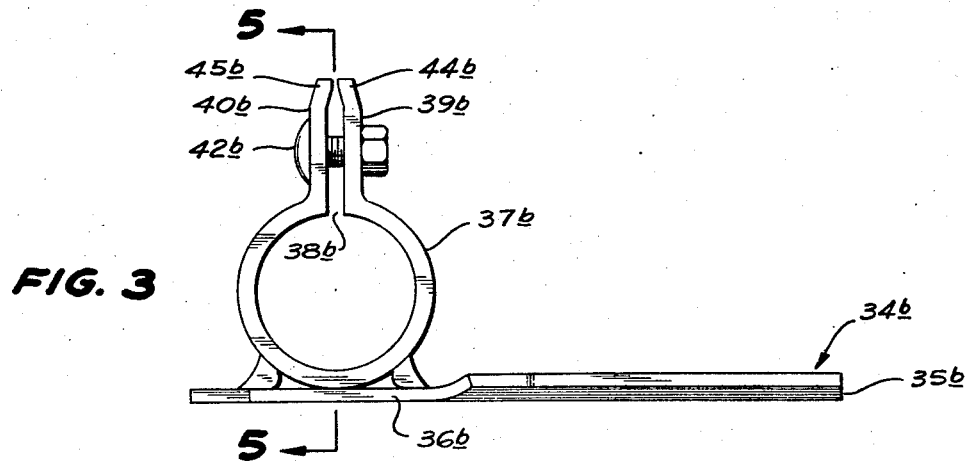
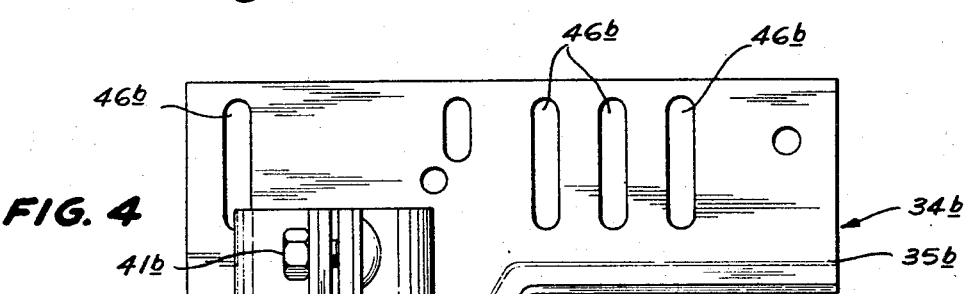
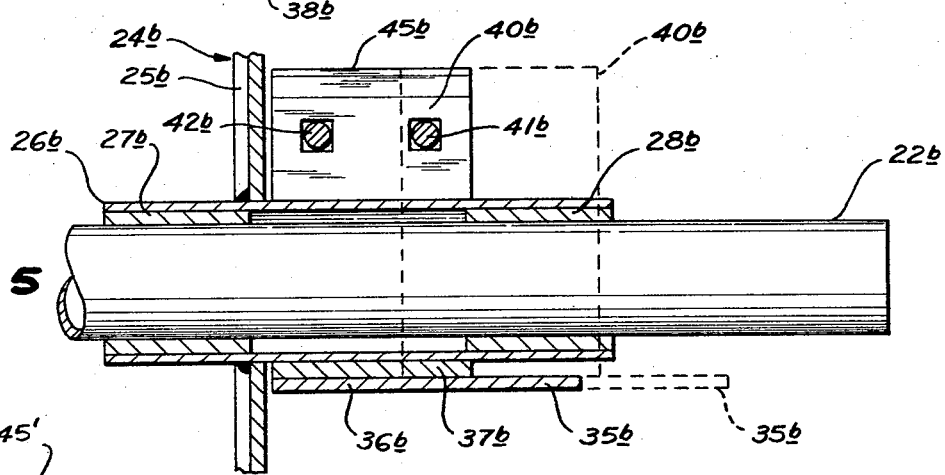
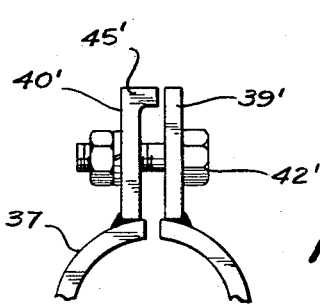
INVENTOR:
CHARLES M. GIBSON
BY: Joseph B. Gardner
ATTORNEY

MOUNTING ADAPTOR FOR A REEL STRUCTURE

This invention relates generally to machinery for harvesting grain, grasses, and similar crops, and it relates more particularly to a reel structure for swathers, combines, and like harvesting machinery and to an arrangement for attaching such reel structure to a harvesting machine.

Swathers, combines, and similar harvesting machines typically include relatively large reel structures that are horizontally disposed and, as such machines move through a field, are rotatably driven to gather the growing crop and feed it to a cutter bar which severs the upstanding crop at a particular location with respect to the ground. The reel structures are provided with an elongated center shaft supported for rotation about the longitudinal axis thereof and equipped radially outwardly therefrom with a plurality of angularly spaced bat assemblies that, in the case of a pickup reel, have thin projecting fingers maintained in a generally vertical orientation as the reel structure rotates about its horizontally disposed, longitudinal axis. As the pick-up reel is rotated, the finger-equipped bat assemblies thereof successively sweep downwardly into the crop to gather the same and urge it through the reel and against the cutter bar which severs the crop to free it from its root system buried within the ground.

These reel structures are sold separately from the harvesting machinery used to rotatively propel the same through a growing crop in the harvest thereof, and it is therefore necessary to attach the reels to the mounting frame or bracket provided for this purpose by the harvesting machinery with which the reel is to be used. Since the machinery is made by different manufacturers, the dimensional standards for such mounting frame may vary considerably, and in any case, there may be some dimensional differences in the machinery made by any one supplier because of necessary manufacturing tolerances.

Also as respects pick-up reels, it is often advantageous to adjust the angle at which the pick-up fingers thereof enter and engage the crop being harvested so as to tailor the interaction of the fingers and crop to the growth characteristics of the latter which vary considerably from light weight and upstanding to heavy and down-and-lodged. Although means are presently arranged with conventional pick-up reel structures to permit some adjustment of the fingers thereof, such means are difficult to use and offer a very limited range of adjustment.

In view of the foregoing, an object of the present invention is to provide an improved arrangement for attaching a rotatable harvester reel (or other reel structure) having a plurality of axially extending angularly spaced bars or blade-like members, adapted to be held in generally parallel alignment as the reel rotates, to a machine or mechanism with respect to which the reel is rotatable.

Further objects, among others, of the present invention are in the provision of an improved harvester reel (sweep reel, hay rake, pick-up reel, and the like), control plate assembly, and mounting adaptor for attaching the reel structure to a harvesting machine, and which control plate assembly and mounting adaptor permit accommodation of any dimensional variations in the mounting or support structure provided by the machine and by means of which the reel is rotatably supported thereon; which permit adjustment of the angular orientation of the axially extending bars or members (finger-equipped bats in the case of a pick-up reel) through a very extended range of adjustment that, in specific embodiments of the invention in which the adjustment is accommodated by angular displacements of a control plate, extends through a complete 360° rotation; and which are structurally simple, easy to use, and relatively inexpensive.

Additional objects and advantages of the invention, especially as concerns particular features and characteristics thereof, will become apparent as the specification continues.

Embodiments of the invention are illustrated in the accompanying drawings, in which:

FIG. 3 is an end view in elevation of the mounting adaptor;

FIG. 4 is a top plan view of the mounting adaptor illustrated in FIG. 3;

FIG. 5 is a longitudinal sectional view taken along the line 5—5 of FIG. 3; and

FIG. 6 is a broken end view in elevation, similar to that of FIG. 3, but showing a slightly modified mounting adaptor.

The invention is applicable to a great variety of reel structures rotatable about an axis extending longitudinally therethrough and having a plurality of axially extending bars, bats, blades, or similar members located radially outwardly from the axis of rotation in angularly spaced relation thereabout. Each member is rotatable about its own axis and is maintained in substantially parallel relation with the others as the reel rotates, usually by means of an eccentric linkage. Harvester reels provide an exemplary environment for the invention and, in particular, pick-up reels, sweep reels, hay rakes, and the like.

Figure 1:
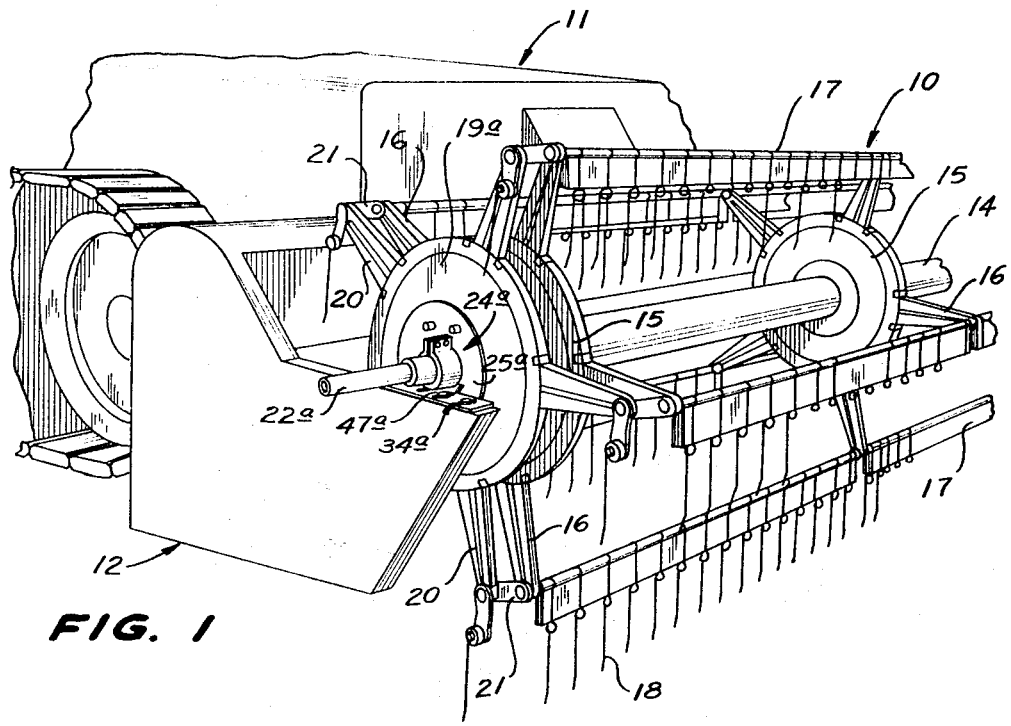
FIG. 1 is a broken perspective view of a pick-up reel rotatably supported at the forward end of a vehicle operative to rotatably propel the reel through a crop to be harvested.

The typifying harvesting reel structure illustrated in part in FIG. 1 is a pick-up reel denoted in it entirety with the numeral 10. As indicated hereinbefore, the pick-up reel structure 10 is intended to traverse a field having a crop ready to be harvested and, accordingly, the reel must be attached to or mounted upon a vehicle operative to propel it about the field. As concerns such vehicle, it may be completely conventional and the exemplary vehicle depicted in FIG. 1 is generally denoted with the numeral 11. The harvesting vehicle 11 is equipped at the forward end thereof with a mounting frame 12, and the reel 10 is rotatably supported adjacent the opposite ends thereof upon the frame 12, as will be described in detail hereinafter. Although not pertinent to the present invention, it may be observed that the frame 12 is adapted to be raised and lowered so as to control and adjust the elevation of the reel structure 10 and cutter bar (not shown) with respect to the crop being harvested.

The reel structure 10 includes a longitudinally extending center shaft or axle 14 which may be continuous or comprised of a plurality of interconnected sections. Mounted upon the center shaft 14 so as to rotate therewith are a plurality of drive spiders or drive hubs 15 each of which constitutes a central plate or disc or generally cylindrical configuration equipped with angularly spaced, radially extending arms 16 projecting outwardly therefrom. In the specific reel structure shown, each of the drive hubs 15 is equipped with five radially extending arms angularly spaced from each other by equal distances of 72° from center-to-center. The radially extending arms 16 of all of the drive hubs 15 are aligned axially along the reel structure so that each successive pair of aligned arms can support a bat assembly 17 therebetween.

Each bat assembly 17 is supported by the arms of the drive hubs 15 for rotational movement with respect thereto for the purpose of enabling the bat assembly to maintain a predetermined orientation (generally vertical) as the reel structure 10 and drive hubs 15 thereon rotate about the longitudinal axis of the center shaft 14. Each of the bat assemblies 17 is equipped with a plurality of axially spaced pick-up fingers 18, and the purpose of maintaining the bat assemblies in a predetermined orientation as the reel structure 10 is rotated is to enforce a particular orientation upon the fingers 18 as they are moved downwardly into engagement with a crop to lift the same and direct it into a cutting bar (not shown) operative to sever the crop at a particular elevation with respect to the ground surface being traversed by the vehicle 11.

The reel structure 10 is equipped adjacent the ends thereof with control spiders or control hubs 19a and 19b each of which is provided with a plurality of angularly spaced and radially extending arms 20 corresponding in number to the number of the arms 16 of the drive hubs 15 which, in the particular reel structure 10 being considered, constitutes five angularly spaced arms in each instance. Each arm 20 of the control hubs 19 is connected through a linkage 21 to the associated bat assembly 17 so as to effect rotation thereof relative to the drive hubs 15 as the reel structure 10 is rotatably driven, thereby maintaining the bat assemblies and the pick-up fingers 18 thereof in a generally vertical orientation at all times as the reel structure traverses in arcuate paths of 360°. As explained in further detail hereinafter, the reason that the control hubs 19 are operative to effect rotation of the bat assemblies 17 is that the axes of rotation of the drive hubs 15 (i.e., the longitudinal axis of the center shaft or axle 14) and control hubs 19 are eccentrically disposed in such a manner that the relative displacements of each associated pair of arms 16 and 20 results in the linkage 21 interconnecting the same to rotate the associated bat assembly 17 about the longitudinal axis thereof so as to maintain the pick-up fingers 18 in the desired orientation. Also as explained hereinafter, the relative positions of the axes of rotation of the drive hubs 15 and control hubs 19 can be adjusted so that the orientation of the bat assemblies 17 and pick-up fingers 18 thereof can be changed slightly to assure their most efficient coaction with the particular crop being harvested. As respects the present invention, the general construction and characteristics of the pick-up reel 10 may be conventional, and further details concerning the same are available in the copending patent application of Thomas O'D. Connolly, Ser. No. 820,683, Filed Apr. 30, 1969, now U.S. Pat. No. 3,546,863 and the copending patent application of Charles M. Gibson, Ser. No. 807,031, Filed Mar. 13, 1969, now U.S. Pat. No. 3,550,366.

Figure 2:
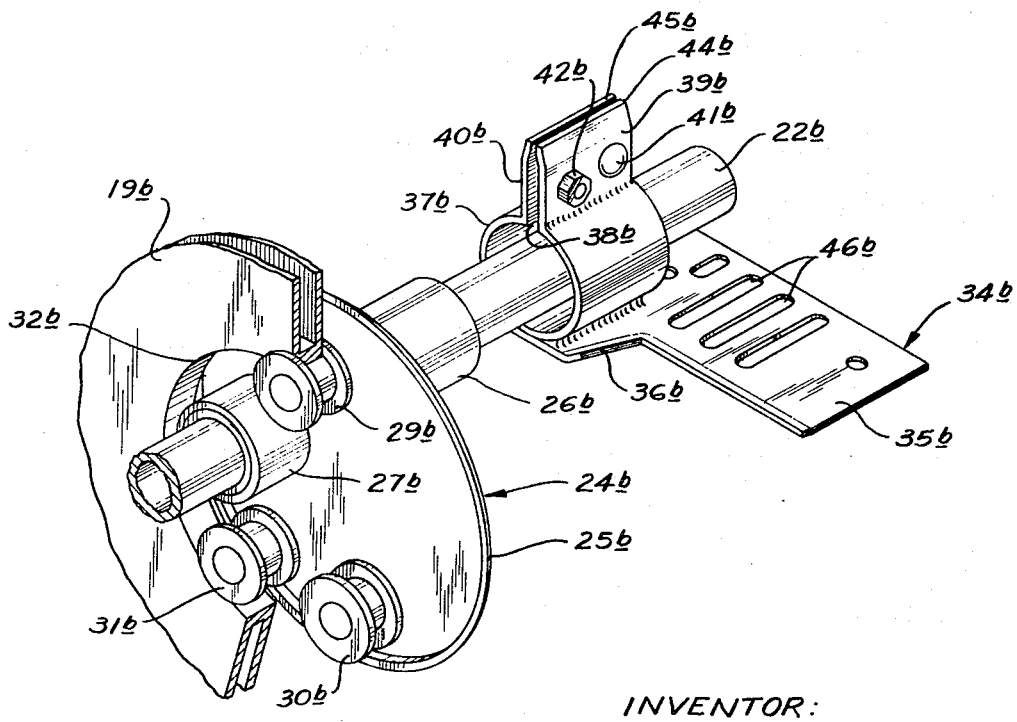
FIG. 2 is an enlarged perspective view illustrating the mounting adaptor and control plate assembly in spaced apart relation, and with a control hub partially shown in operative association with the control plate assembly.

The elongated longitudinally extending axle or center shaft 14 defining the axis of rotation for the reel structure 10 is hollow and is equipped at the ends thereof with extensions 22a and 22b of smaller diameter so as to be telescopically received within the main body of the axle 14 in a manner preventing relative rotation therebetween and enforcing coaxiality thereon. The extensions 22 may be either solid or hollow tubular shafts, the latter being shown, and they are adapted to cooperate with control plate assemblies 24a and 24b respectively associated with the control hubs 19a and 19b. In this respect, each control plate assembly 24 includes (see FIGS. 2 and 5 in particular) a generally cylindrical or circular control plate 25 that may be substantially planar except at the perimetric edge thereof which is turned laterally toward the associated control hub 19. Each control plate assembly 24 also includes bearing structure 26 carried by the plate 25 and rotatably receiving the associated end portion 22 of the shaft 14 to define a journal therefor. In the particular control plate assemblies 24 being considered, the bearing structure 26 is a hollow tubular sleeve of cylindrical configuration equipped with axially spaced bearings in the form of bushings 27 and 28 providing a rotatable support for the associated shaft end portion 22.

The bearing structure 26 and especially the hollow sleeve thereof is elongated and it extends through the associated plate 25 and is rigidly secured thereto as by welding. As is made most evident in FIG. 2, the position of the sleeve 26 is offset from the geometric center of the plate 25 and which geometric center establishes the axis of rotation for the associated control hub 19. More particularly, each of the control plates 25 is equipped with a plurality of angularly spaced rollers, there being three such rollers respectively denoted with the numerals 29, 30, and 31 in the structure being considered. The rollers are rotatably supported by the associated plate 25 and extend axially therefrom on the side of the plate facing the associated control hub 19. The rollers are disposed so as to define or lie along the circumference of a circle having its center at the geometric center of the plate 25 (this precise relationship is not critical, the significant factor being that the center of the circular path defined by the rollers is offset from the axis of rotation of the shaft 14). Each control hub 19 has a large central opening 32 therethrough having essentially the same diameter as that of the circular path defined by the rollers 29 through 31, and the control plate is supported upon such rollers and is therefore rotatable with respect to the plate 25 and bearing sleeve 26 rigidly attached thereto. In the form shown, each of the rollers 29 through 31 has flanges that border the associated control hub 19 so as to prevent bodily displacements thereof along the axis of the shaft 14.

For purposes of attaching the reel structure 10 and control plate assemblies 24 to the mounting frame or bracket 12 carried by the vehicle 11, a pair of mounting adaptors are provided, one of which is shown in the drawings and is generally denoted with the numeral 34b because of its association with the control hub 19b and control plate assembly 24b. A comparison of the control plate assemblies 24a and 24b respectively shown in FIGS. 1 and 2 makes it evident that they are reversely oriented with respect to each other, the control hubs 19 being located inwardly of the respectively associated control plate assemblies in each case. Analogously, the mounting adaptors 34a and 34b differ one from another in minor respect in that they are made in pairs respectively cooperative with the shaft or axle 14 at the opposite ends thereof. The differences are quite minor, and will become more apparent hereinafter.

Each mounting adaptor 34 includes base structure 35 adapted to be secured to the vehicle 11 and, in particular, to the support frame 12 thereof. The base structure 35 is in the form of a flat plate of generally rectangular configuration except for a lateral projection 36 adjacent one end. Fixedly secured to the plate 35 at the projection 36 thereof is a clamp collar 37 adapted to grippingly engage a portion of the bearing structure 26 of the control plate assembly 24 in circumjacent relation therewith. The clamp collar 37 is of substantially cylindrical configuration and is slit and equipped with outwardly extending facing flanges 39 and 40 disposed in substantially parallel relation and adapted to be drawn toward each other from an outer release position toward an inner clamping position to grip the tubular bearing structure 26 in tight frictional engagement. Releasable fastener means in the form of axially spaced nut and bolt assemblies 41 and 42 are connected with the flanges 39 and 40 and are operative to selectively displace the same between the release and clamp positions thereof. As shown best in FIGS. 3 and 4, the operative association of the releasable fastener means with the flanges 39 and 40 constitutes projection of the bolts of the fasteners through openings provided therefor in the flanges. The fasteners may be reversely oriented, as shown, to facilitate wrench-manipulation and tightening of the nuts upon the respective bolts.

The flanges 39 and 40 are equipped with abutment structure adjacent the outer ends thereof which, in the form illustrated in FIG. 1 through 5, constitutes the outer edges of the flanges being turned inwardly toward each other, as shown at 44 and 45, so that such edges are drawn into rigid abutment whenever the nut and bolt assemblies 41 and 42 are tightened to clamp the collar 37 about the tubular bearing structure 26. This arrangement causes the clamp collar 37 to maintain its circular or cylindrical configuration as it is tightened about the tubular bearing structure, thereby preventing the collar from locally stressing the tubular bearing or sleeve 26 when the fastener means are tightened.

A somewhat modified abutment structure is illustrated in FIG. 6 in which the flanges 39' and 40' are separate components welded to the clamp collar 37' rather than being formed integrally therewith as in the case of the collar 37b and flanges 39b and 40b. The flanges are drawn or displaced toward each other by a nut and bolt type fastener 42', and the flange 40' is equipped with abutment structure 45' at its upper end that is turned laterally toward the facing flange 39' which is a substantially planar component. Whenever the flanges 39 and 40 are displaced toward each other to cause the clamp collar 37 to grippingly engage a tubular bearing structure or sleeve, the abutment structure 45' will engage the flange 39' and enforce circularity upon the clamp collar 37' in the same manner as the abutment structure 44b, 45b heretofore described.

The base structure 35 is adapted to be removably secured to the mounting frame 12 of the vehicle 11, and it is also adjustable with respect thereto generally along the axis of the shaft 14. Means are provided by the base structure 35 to permit such adjustable positioning thereof relative to the mounting frame, and such means takes the form of a plurality of axially elongated slots 46 through which bolts 47 (FIG. 1) extend for coaction with the frame 12 or nuts provided thereby. It will be evident that each of the mounting adaptors 34 and face plate 35 thereof is axially adjustable within the dimensional limits of the slots 46 between the inner and outer positions respectively illustrated in full and broken lines in FIG. 5. Thus, the mounting adaptors 34 are able to accommodate dimensional differences in the axial direction between the forwardly extending support arms of the frame 12 which may be occasioned by variations in the standard dimensions adopted by different vehicle manufacturers and by ordinary manufacturing tolerances.

Mounting the reel structure 10 upon the frame 12 of any particular vehicle 11 entails use of right-handed and left-handed adaptors 34 which have the fasteners 41 and 42 thereof loosened so that the collars 37 can be placed upon the bearing structures or sleeves 36 in coaxially circumjacent relation therewith. The plates 35 of the adaptor 34 are then placed upon the upwardly facing, horizontal surfaces of the mounting frame 12, and the plates shifted axially as need be to accommodate the dimensional requirements of the mounting frame after which the fasteners 47 are tightened to rigidly secure the adaptors to the mounting frame.

It will be appreciated that the substantial length of the tubular bearing structures or sleeves 26 accommodates any such longitudinal adjustments of the adaptors 34 because in either the extreme inner or extreme outer position of adjustment of any adaptor, as shown in FIG. 5, the clamp collar 37 remains in circumjacent relation with the sleeve 26. The control plates 25 and bearing sleeves 26 are then adjusted angularly relative to the clamp collars 37 so as to shift the axis of rotation of the control hubs 19 relative to the axis of rotation of the reel structure 10 to obtain the desired angular disposition of the pick-up fingers 18 at the moment of their downward movement into the particular crop being harvested, and then the fasteners 41 and 42 associated with each clamp collar 37 are tightened so as to frictionally grip the associated bearing sleeve 26 and constrain the same against both longitudinal and angular displacements. Operation of the vehicle 11 rotatably propels the reel structure 10 through a crop being harvested because of the forward travel of the vehicle and because of the driving connection (not shown) between the reel structure and vehicle causing the reel structure to rotate about the longitudinal axis of the center shaft or axle 14.

Should it be desirable or necessary to change the angular inclination of the pick-up fingers 18 at the time of their interception of a crop, the clamp collars 37 are loosened and the control plates 25 displaced angularly relative to the respectively associated control hubs 19 to effect the desired disposition of the pick-up fingers. Great force is not required to angularly adjust the control plates 25 because along the inner surface of each bearing sleeve 26 it is rotatably supported relative to the shaft extension or end portion 22 by bearings 27 and 28, and along its outer surface it is loosely located within the circumjacent clamp collar 37. As explained hereinbefore, whenever the clamp collar is displaced toward the sleeve-gripping position thereof upon tightening of the fasteners 41 and 42, the abutment structure at the outer end portion of the flanges 39 and 40 maintains circularity of the collar to prevent it from locally stressing and thereby deforming the sleeve 26.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. In combination with a harvester reel or the like adapted to be propelled through a crop in harvesting the same and which reel is provided with a longitudinally extending axle defining the axis of rotation thereof, is also provided with a plurality of axially extending angularly spaced members successively engageable with such crop as the reel is rotatably propelled therethrough, and is further provided with a control hub rotatable with said reel and connected with said members to maintain the same in a predetermined orientation as the reel is rotated; a control plate assembly including a control plate supporting said control hub for rotation in unison with said reel about a control axis eccentrically spaced from the axis of rotation of said reel, and bearing structure carried by said control plate and rotatably receiving an end portion of said axle to define a journal therefor; and a mounting adaptor for attaching said reel adjacent an end portion thereof to a vehicle operative to rotatably propel the same and including base structure adapted to be secured to such vehicle, a clamp collar carried by said base structure for realeasably gripping a portion of said bearing structure in circumjacent relation therewith, and releasable fastener means connected with said clamp collar for effecting selective displacement thereof between the release and clamp positions thereof, said bearing structure and control plate carrying the same being angularly displaceable substantially without angular limit upon release of said clamp collar.

2. The combination of claim 1 in which said bearing structure comprises an elongated hollow sleeve extending transversely with respect to said control plate and fixedly secured thereto, said sleeve being disposed within said clamp collar and being both longitudinally and angularly displaceable with respect thereto in the release position thereof.

3. The combination of claim 1 in which said clamp collar has spaced edge portions equipped with facing outwardly extending flanges adapted to be displaced toward and away from each other between clamp and release positions to compress said clamp collar into tight frictional engagement with said bearing portion and to release said clamp collar therefrom, and in which said releasable fastener means is connected with said flanges for selectively displacing the same between the release and clamp positions thereof.

4. The combination of claim 3 in which said outwardly extending flanges are equipped adjacent the outer end portions thereof with abutment structure intermediate the facing surfaces thereof, said fastener means being connected with said flanges intermediate said abutment structure and clamp collar, whereby circularity of the clamp collar is maintained upon tightening said fastener means to cause said clamp collar to grippingly engage said bearing portion.

5. The combination of claim 3 in which said bearing structure comprises an elongated hollow sleeve extending transversely with respect to said control plate and fixedly secured thereto, said sleeve being longitudinally and angularly displaceable with respect to said clamp collar in the release position thereof.

6. The combination of claim 5 in which said fastener means includes nut and bolt structure extending through said flanges.

7. A mounting adaptor for securing a reel structure adjacent an end thereof to a vehicle from which the reel structure is rotatably driven, comprising base structure adapted to be secured to such vehicle, a clamp collar carried by said base structure for releasably gripping a portion of such reel structure to support the same with respect to such vehicle, said clamp collar having spaced edge portions equipped with facing outwardly extending flanges adapted to be displaced toward and away from each other between clamp and release positions to compress said clamp collar into tight frictional engagement with the portion of such reel structure engaged thereby and to release said clamp collar therefrom, and releasable fastener means connected with said flanges for selectively displacing the same between the release and clamp positions thereof.

8. The adaptor of claim 7 in which said outwardly extending flanges are equipped adjacent the outer end portions thereof with abutment structure disposed intermediate the facing surfaces of said flanges, said fastener means being connected with said flanges intermediate said abutment structure and clamp collar whereby circularity of the clamp collar is maintained upon tightening said fastener means to cause said clamp collar to circumferentially grip the aforesaid portion of such reel structure.

9. The adaptor of claim 8 in which said abutment structure comprises inwardly projecting lateral edges adjacent the outer free ends of said flanges.

10. The adaptor of claim 8 in which at least one of said flanges is provided with an inwardly projecting lateral edge adjacent the outer free end thereof extending toward the facing surface of the opposite flange.

* * * * *